US010936486B1

(12) United States Patent
Swarbrick (10) Patent No.: US 10,936,486 B1
(45) Date of Patent: Mar. 2, 2021

(54) ADDRESS INTERLEAVE SUPPORT IN A PROGRAMMABLE DEVICE

(71) Applicant: Xilinx, Inc., San Jose, CA (US)

(72) Inventor: Ian A. Swarbrick, Santa Clara, CA (US)

(73) Assignee: XILINX, INC., San Jose, CA (US)

(\*) Notice: Subject to any disclaimer, the term of this patent is extended or adjusted under 35 U.S.C. 154(b) by 93 days.

(21) Appl. No.: 16/282,081

(22) Filed: Feb. 21, 2019

(51) Int. Cl.
*G06F 12/00* (2006.01)
*G06F 12/06* (2006.01)

(52) U.S. Cl.
CPC .. *G06F 12/0607* (2013.01); *G06F 2212/1008* (2013.01)

(58) Field of Classification Search
CPC combination set(s) only.
See application file for complete search history.

(56) References Cited

U.S. PATENT DOCUMENTS

| | | | |
|---|---|---|---|
| 6,781,407 B2 | 8/2004 | Schultz | |
| 7,199,608 B1 | 4/2007 | Trimberger | |
| 7,301,822 B1 | 11/2007 | Walstrum, Jr. et al. | |
| 7,328,335 B1 | 2/2008 | Sundararajan et al. | |
| 7,420,392 B2 | 9/2008 | Schultz et al. | |
| 7,576,561 B1 | 8/2009 | Huang | |
| 7,653,820 B1 | 1/2010 | Trimberger | |
| 7,689,726 B1 | 3/2010 | Sundararajan et al. | |
| 9,152,794 B1 | 10/2015 | Sanders et al. | |
| 9,165,143 B1 | 10/2015 | Sanders et al. | |
| 9,230,112 B1 | 1/2016 | Peterson et al. | |
| 9,323,876 B1 | 4/2016 | Lysaght et al. | |
| 9,336,010 B2 | 5/2016 | Kochar | |
| 9,411,688 B1 | 8/2016 | Poolla et al. | |
| 9,652,252 B1 | 5/2017 | Kochar et al. | |
| 9,652,410 B1 | 5/2017 | Schelle et al. | |
| 2004/0114609 A1 | 6/2004 | Swarbrick et al. | |
| 2004/0210695 A1 | 10/2004 | Weber et al. | |
| 2008/0320255 A1 | 12/2008 | Wingard et al. | |
| 2008/0320268 A1 | 12/2008 | Wingard et al. | |
| 2012/0036296 A1 | 2/2012 | Wingard et al. | |
| 2017/0140800 A1 | 5/2017 | Wingard et al. | |
| 2019/0306005 A1\* | 10/2019 | Desai | G06F 12/10 |

OTHER PUBLICATIONS

U.S. Appl. No. 15/936,916, filed Mar. 27, 2018, Swarbrick, I.A., et al., San Jose, CA USA.
U.S. Appl. No. 15/588,321, filed May 5, 2017, Camarota, R., et al., San Jose, CA USA.

\* cited by examiner

*Primary Examiner* — Yong J Choe
(74) *Attorney, Agent, or Firm* — Patterson + Sheridan, LLP (57) ABSTRACT

Techniques for providing address interleave support in a programmable device are described. In an example, a programmable integrated circuit (IC) includes a processing system, programmable logic, a plurality of master circuits disposed in the processing system, the programmable logic, or both the processing system and the programmable logic, an address interleave and transaction chopping circuit, a memory having a plurality of channels, and a system interconnect configured to couple the address interleave and transaction chopping circuit to the memory. The address interleave and transaction chopping circuit is configured to interleave memory transactions from the plurality of master circuits across the plurality of channels of the memory at a selected boundary.

21 Claims, 10 Drawing Sheets

ADDRESS INTERLEAVE SUPPORT IN A PROGRAMMABLE DEVICE

TECHNICAL FIELD

Examples of the present disclosure generally relate to electronic circuits and, in particular, to address interleave support in a programmable device.

BACKGROUND

Advances in integrated circuit technology have made it possible to embed an entire system, such as including a processor core, a memory controller, and a bus, in a single semiconductor chip. This type of chip is commonly referred to as a system-on-chip (SoC). Other SoCs can have different components embedded therein for different applications. The SoC provides many advantages over traditional processor-based designs. It is an attractive alternative to multi-chip designs because the integration of components into a single device increases overall speed while decreasing size. The SoC is also an attractive alternative to fully customized chips, such as an application specific integrated circuit (ASIC), because ASIC designs tend to have a significantly longer development time and larger development costs. A configurable SoC (CSoC), which includes programmable logic, has been developed to implement a programmable semiconductor chip that can obtain benefits of both programmable logic and SoC. An SoC can be attached to memory and/or can include memories therein. Circuits in the SoC can be coupled to the memory through memory controllers. It is desirable to increase performance of the communication between circuits in the SoC and memory coupled to and/or disposed in the SoC.

SUMMARY

Techniques for providing address interleave support in a programmable device are described. In an example, a programmable integrated circuit (IC) includes: a processing system; programmable logic; a plurality of master circuits disposed in the processing system, the programmable logic, or both the processing system and the programmable logic; an address interleave and transaction chopping circuit; a memory having a plurality of channels; and a system interconnect configured to couple the address interleave and transaction chopping circuit to the memory; wherein the address interleave and transaction chopping circuit is configured to interleave memory transactions from the plurality of master circuits across the plurality of channels of the memory at a selected boundary.

In another example, a method of communication between a plurality of master circuits and a memory in a system-on-chip (SoC) includes: receiving, at an address interleave and transaction chopping circuit, memory transactions from a plurality of master circuits for the memory; dividing, for each memory transaction by the address interleave and transaction chopping circuit, the memory transaction across a plurality of channels of the memory; and forwarding the memory transactions from the address interleave and transaction chopping circuit to the memory.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for providing address interleave support in a programmable device are described. In an example, a programmable device includes hardened capability at the interface between programmable logic (PL) and the remaining portion of the system. This allows circuits in the PL to take advantage of memory interleaving without the burden of the associated management logic. The advantages of the techniques are: (1) better balancing of bandwidth across multiple memory channels for the majority of applications; and (2) ease of management of the memory pool in the device (for both hardware and software entities). Without memory interleaving, the master accessing the memory needs to track which memory channel has the data in order to optimize performance. For example, if the majority of requests all go to one of four memory channels and the other three channels sit relatively idle, device performance will be poor. Memory interleaving spreads the traffic across memory channels (or generically, pools of memory). This keeps each channel relatively busy and spreads the traffic load across channels. These and further aspects of the techniques are described below.

Figure 1:
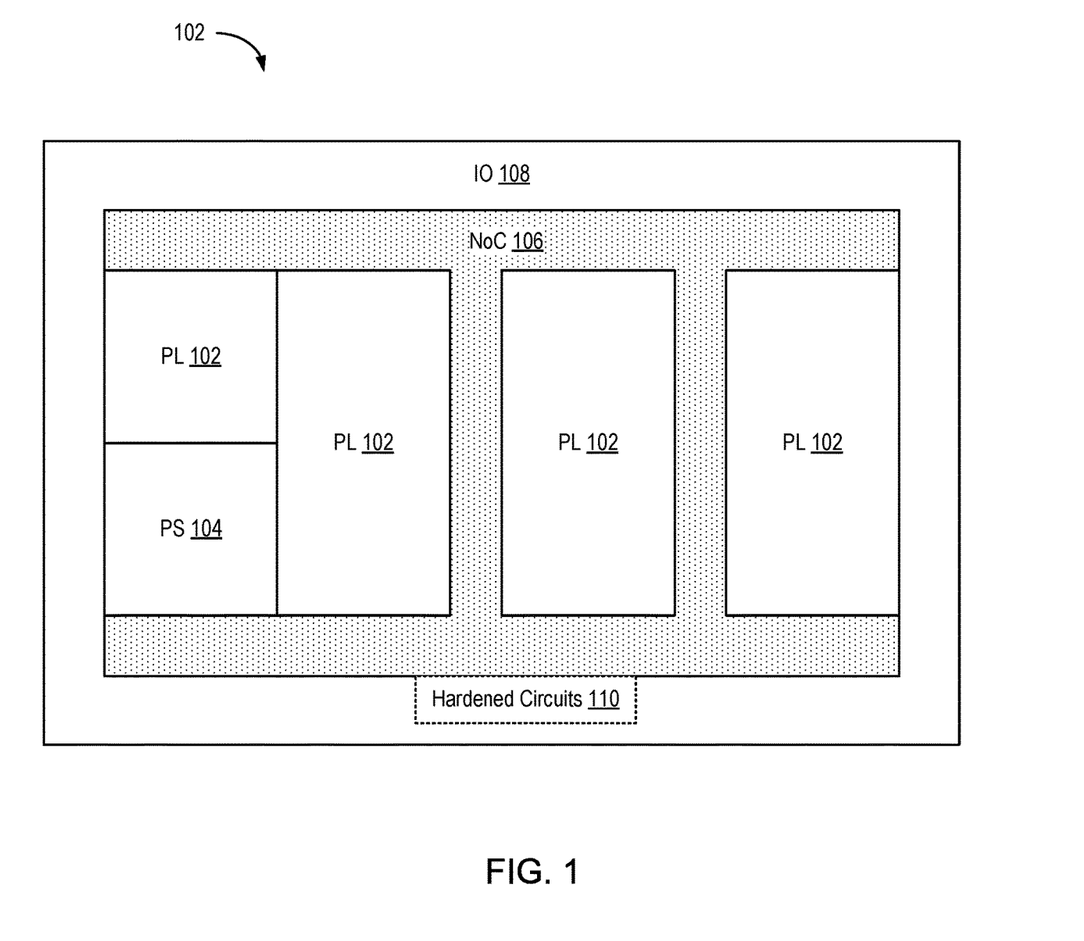
FIG. 1 is a block diagram depicting a system-on-chip (SoC) according to an example.

FIG. 1 is a block diagram depicting a system-on-chip (SoC) 102 according to an example. The SoC 100 is an integrated circuit (IC) that includes a plurality of regions having circuitry with different functionalities. In the example, the SoC 100 includes programmable logic (PL) regions 102, a processing system (PS) 104, a network-on-chip (NoC) 106, and input/output (IO) region 108. In some examples, the SoC 100 includes hardened circuits 110, such as memory controllers, processing engines, or the like. The programmable logic region(s) 102 can include any number of configurable logic blocks (CLBs), which may be programmed or configured to form specific circuitry. The PS 104 can include one or more processor cores and associated support circuitry. For example, the processing system can include a number of ARM-based embedded processor cores. The NoC 106 includes an interconnecting network for sharing data between endpoint circuits in the SoC 100. The endpoint circuits can be disposed in the PL regions 102, the PS 104, the hardened circuits 110, and/or the 10 region 108. The NoC 106 can include high-speed data paths with dedicated switching. In an example, the NoC 106 includes horizontal paths, vertical paths, or both horizontal and vertical paths. The 10 region 108 can include input/output blocks (IOBs) and the like for transmitting and receiving signals external to the SoC 100. The arrangement and number of regions shown in FIG. 1 is merely an example. In general, the SoC 100 includes one or more PL regions 102, a PS 104, and a NoC 106.

Figure 2:
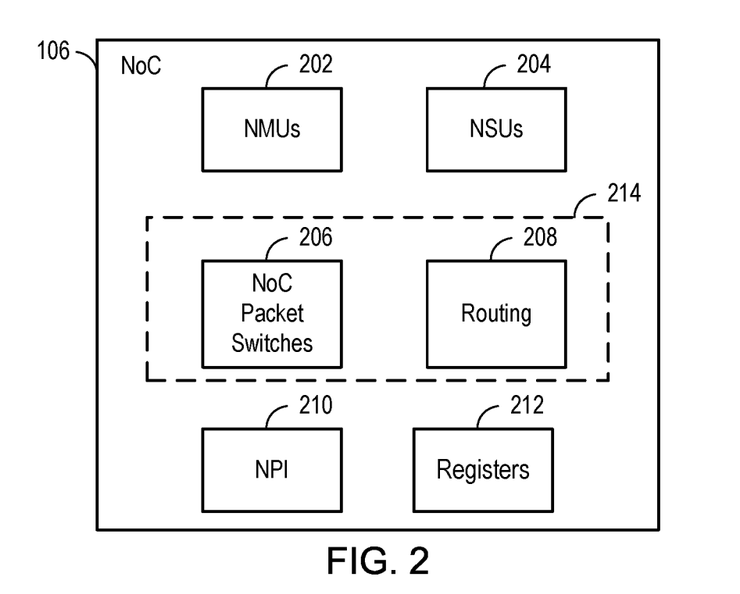
FIG. 2 is a block diagram depicting a network on chip (NoC) according to an example.

FIG. 2 is a block diagram depicting the NoC 106 according to an example. The NoC 106 includes NoC master units (NMUs) 202, NoC slave units (NSUs) 204, a network 214, NoC peripheral interconnect (NPI) 210, and registers 212. Each NMU 202 is an ingress circuit that connects an endpoint circuit to the NoC 106. Each NSU 204 is an egress circuit that connects the NoC 106 to an endpoint circuit. The NMUs 202 are connected to the NSUs 204 through the network 214. In an example, the network 214 includes NoC packet switches 206 ("NPSs") and routing 208 between the NoC packet switches 206. Each NoC packet switch 206 performs switching of NoC packets. The NoC packet switches 206 are connected to each other and to the NMUs 202 and NSUs 204 through the routing 208 to implement a plurality of physical channels. The NoC packet switches 206 also support multiple virtual channels per physical channel. The NPI 210 includes circuitry to program the NMUs 202, NSUs 204, and NoC packet switches 206. For example, the NMUs 202, NSUs 204, and NoC packet switches 206 can include registers 212 that determine functionality thereof. The NPI 210 includes a peripheral interconnect coupled to the registers 212 for programming thereof to set functionality. The registers 212 in the NoC 106 support interrupts, QoS, error handling and reporting, transaction control, power management, and address mapping control. The registers 212 can be initialized in a usable state before being reprogrammed, such as by writing to the registers 212 using write requests. Configuration data for the NoC 106 can be stored in a non-volatile memory (NVM) and provided to the NPI 210 for programming the NoC 106 and/or other endpoint circuits.

The NMUs 202 are traffic ingress points. The NSUs 204 are traffic egress points. Endpoint circuits coupled to the NMUs 202 and NSUs 204 can be hardened circuits (e.g., hardened circuits 110) or circuits configured in programmable logic. A given endpoint circuit can be coupled to more than one NMU 202 or more than one NSU 204.

Figure 3:
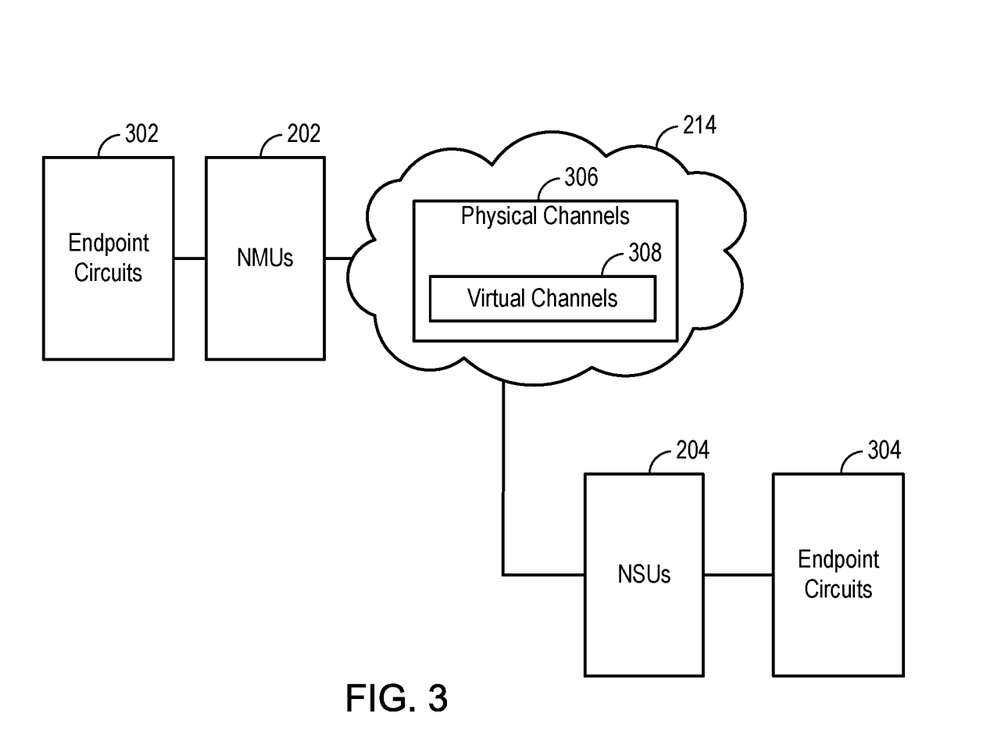
FIG. 3 is a block diagram depicting connections between endpoint circuits in an SoC through a NoC according to an example.

FIG. 3 is a block diagram depicting connections between endpoint circuits in an SoC through the NoC 106 according to an example. In the example, endpoint circuits 302 are connected to endpoint circuits 304 through the NoC 106. The endpoint circuits 302 are master circuits, which are coupled to NMUs 202 of the NoC 106. The endpoint circuits 304 are slave circuits coupled to the NSUs 204 of the NoC 106. Each endpoint circuit 302 and 304 can be a circuit in the processing system 104, a circuit in a programmable logic region 102, or a circuit in another subsystem (e.g., hardened circuits 110). Each endpoint circuit in the programmable logic region 102 can be a dedicated circuit (e.g., a hardened circuit) or a circuit configured in programmable logic.

The network 214 includes a plurality of physical channels 306. The physical channels 306 are implemented by programming the NoC 106. Each physical channel 306 includes one or more NoC packet switches 206 and associated routing 208. An NMU 202 connects with an NSU 204 through at least one physical channel 306. A physical channel 306 can also have one or more virtual channels 308.

Connections through the network 214 use a master-slave arrangement. In an example, the most basic connection over the network 214 includes a single master connected to a single slave. However, in other examples, more complex structures can be implemented.

Figure 4:
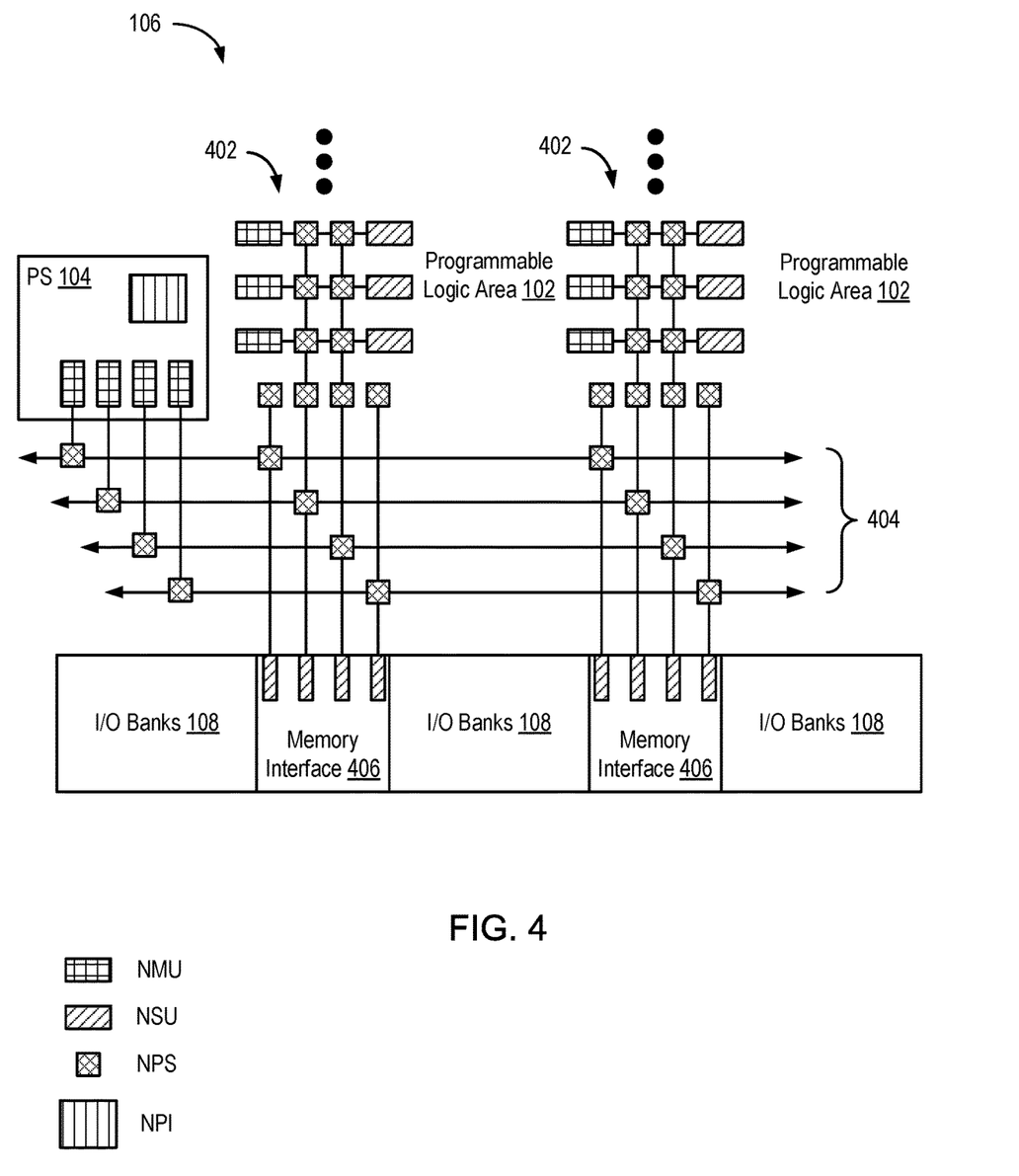
FIG. 4 is a block diagram depicting a NoC according to another example.

FIG. 4 is a block diagram depicting the NoC 106 according to another example. In the example, the NoC 106 includes vertical portions 402 (VNoC) and horizontal portion 404 (HNoC). The VNoC 402 is disposed between PL regions 102. The HNoC 404 is disposed between the PL regions 102 and the 10 regions 108. The hardened circuits 110 include memory interfaces 406. The PS 104 is coupled to the HNoC 404.

In the example, the PS 104 includes a plurality of NMUs 202 coupled to the HNoC 404. The VNoC 402 includes both NMUs 202 and NSUs 204, which are disposed in the PL regions 102. The memory interfaces 406 include NSUs 204 coupled to the HNoC 404. Both the HNoC 404 and the VNoC 402 include NPSs 206 connected by routing 208. In the VNoC 402, the routing 208 extends vertically. In the HNoC 404, the routing extends horizontally. In each VNoC 402, each NMU 202 is coupled to an NPS 206. Likewise, each NSU 204 is coupled to an NPS 206. NPSs 206 are coupled to each other to form a matrix of switches. Some NPSs 206 in each VNoC 402 are coupled to other NPSs 206 in the HNoC 404.

Although only a single HNoC 404 is shown, in other examples, the NoC 106 can include more than one HNoC 404. In addition, while two VNoCs 402 are shown, the NoC 106 can include more than two VNoCs 402. Although memory interfaces 406 are shown by way of example, it is to be understood that other hardened circuits can be used in place of, or in addition to, the memory interfaces 406.

Figure 5A:
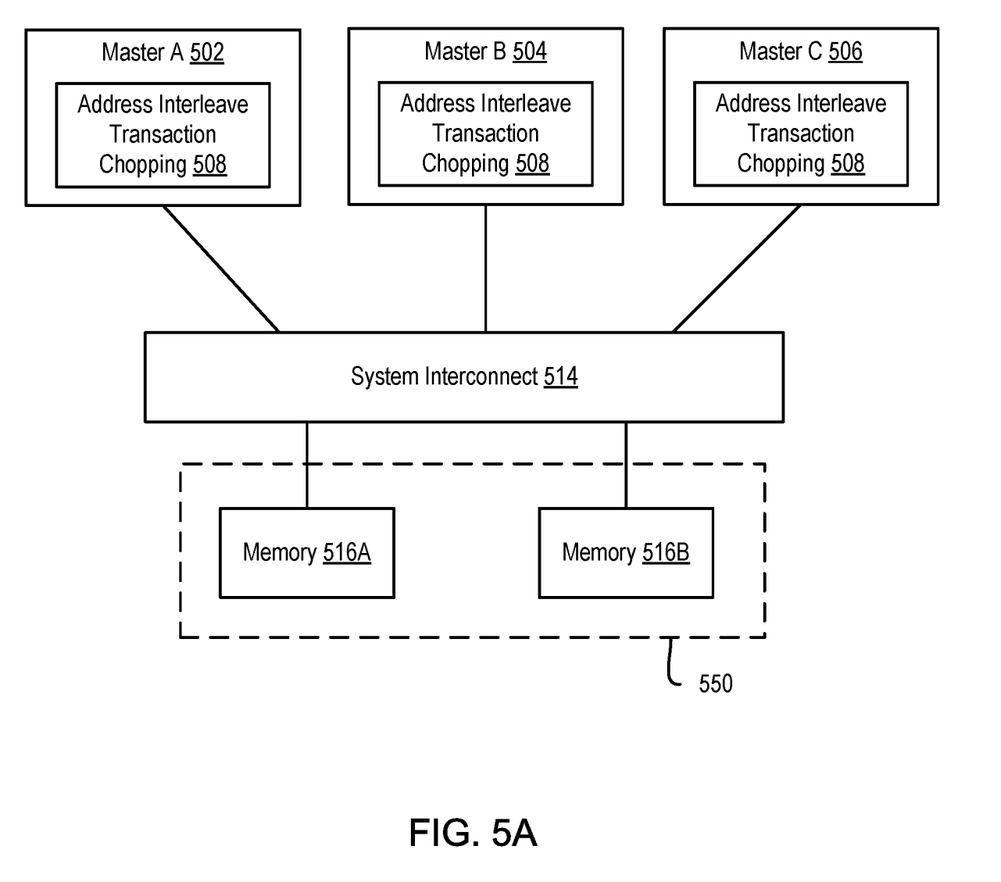
FIGS. 5A and 5B are block diagrams depicting a multi-master system according to an examples.

FIG. 5A is a block diagram depicting a multi-master system 500 according to an example. The multi-master system 500 can be disposed in the SoC 102 described above. The multi-master system 500 includes master circuits 502, 504, and 506, address interleave and transaction chopping circuits 508, system interconnect 514, and memory 516A and memory 516B. Each of the master circuits 502-506 includes an address interleave and transaction chopping circuit 508. The master circuits 502-506 can be hardened circuits or circuits configured in programmable logic. The system interconnect 514 can be the NoC 106 described above. For example, the master circuits 502-506 can be coupled to NMUs 202 in the system interconnect 514. The system interconnect 514 is coupled to the memory 516A and the memory 516B. For example, each of the memory 516A and the memory 516B can be coupled to an NSU 204 in the system interconnect 514.

Figure 5B:
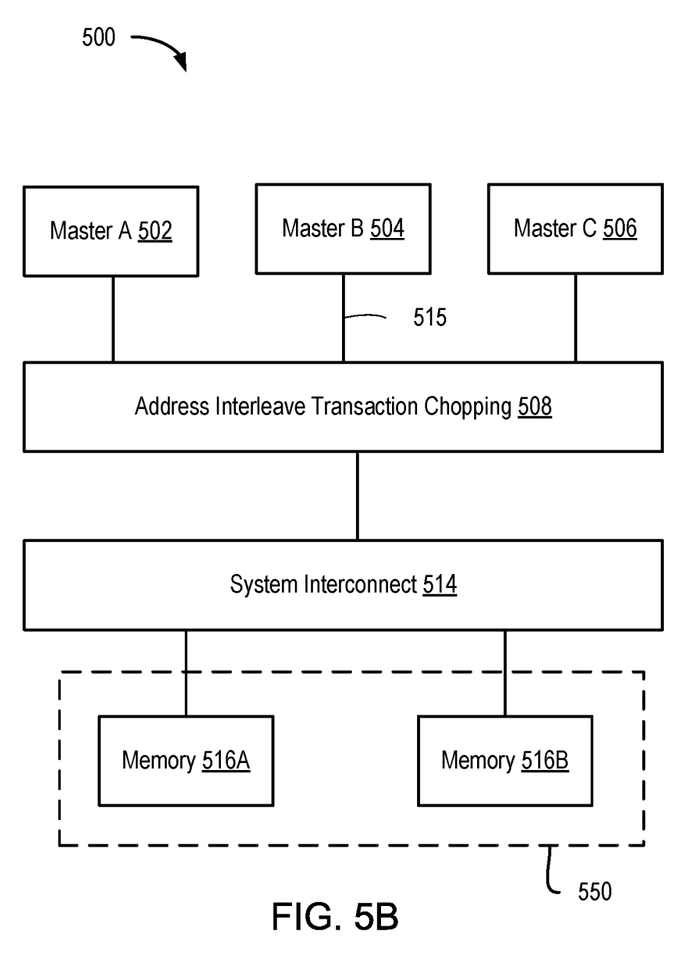

FIG. 5B is a block diagram depicting a multi-master system 500 according to another example. The multi-master system 500 can be disposed in the SoC 102 described above. The multi-master system 500 includes master circuits 502, 504, and 506, address interleave and transaction chopping circuit 508, system interconnect 514, and memory 516A and memory 516B. The master circuits 502-506 are coupled to the address interleave and transaction chopping circuit 508 through a local interconnect 515 (e.g., through AXI interconnect or the like). The master circuits 502-506 can be hardened circuits or circuits configured in programmable logic. The system interconnect 514 can be the NoC 106 described above. For example, the address interleave and transaction chopping circuit 508 can be coupled to NMUs 202 in the system interconnect 514. The system interconnect 514 is coupled to the memory 516A and the memory 516B. For example, each of the memory 516A and the memory 516B can be coupled to an NSU 204 in the system interconnect 514.

Referring to FIGS. 5A and 5B, in the examples, three master circuits 502, 504, and 506 send memory mapped transactions to memory (e.g., memory circuits 516A and 516B). The address interleave and transaction chopping circuit 508 splits the memory transactions on programmable interleave boundaries (e.g., 1 kilobyte (K), 2K, 4K, etc.). In an example, the programmable interleave boundaries can be set by the circuit designer during design of the multi-master system 500. The interleave boundaries become a setting in configuration data for the SoC and set the address interleave and transaction chopping circuit 508 accordingly during configuration of the SoC. In another example, the programmable interleave boundaries can be set dynamically during runtime by sending control data to the address interleave and transaction chopping circuit 508 to set the interleave boundaries. In another example, the programmable interleave boundaries can be set dynamically during runtime by partially reconfiguring the SoC to change the interleave boundaries of the address interleave and transaction chopping circuit 508.

The address interleave and transaction chopping circuit 508 determines which memory circuit each transaction is destined for. The address interleave and transaction chopping circuit 508 also removes address bits depending on the number of channels being interleaved (e.g., one address bit for 2-channel interleave, 2 address bits for 4-channel interleave, etc.). That is, for a 2-channel interleave, half the address space is located in each of the channels (e.g., the address of a memory transaction is divided by two, removing one address bit). For a 4-channel interleave, a quarter of the address space is located in each of the channels (e.g., the address of a memory transaction is divided by four, removing two address bits). The address bit(s) removed is/are the one(s) just above the interleave boundary. For example, if the interleave is 1K and 2-channel interleaving is performed, bit 10 of the memory transaction is removed.

When more than one memory channel is available on a device, memory interleaving is a useful feature. Memory interleaving makes the participating memory channels appear as one large pool of memory. The memory may still be spread across discontinuous physical regions like a single memory channel, with a small region in the address space and a larger region somewhere higher in the address space. Memory traffic is balanced across the participating memory channels in hardware and software does not need to determine how to place data in order to effectively use more than one memory channel.

In an example, the memory circuits 516 are hardened circuits, which can be disposed in the SoC or external to the SoC. In another example, the memory circuits 516 comprise circuitry configured in the programmable logic 550 of the SoC.

Figure 6:
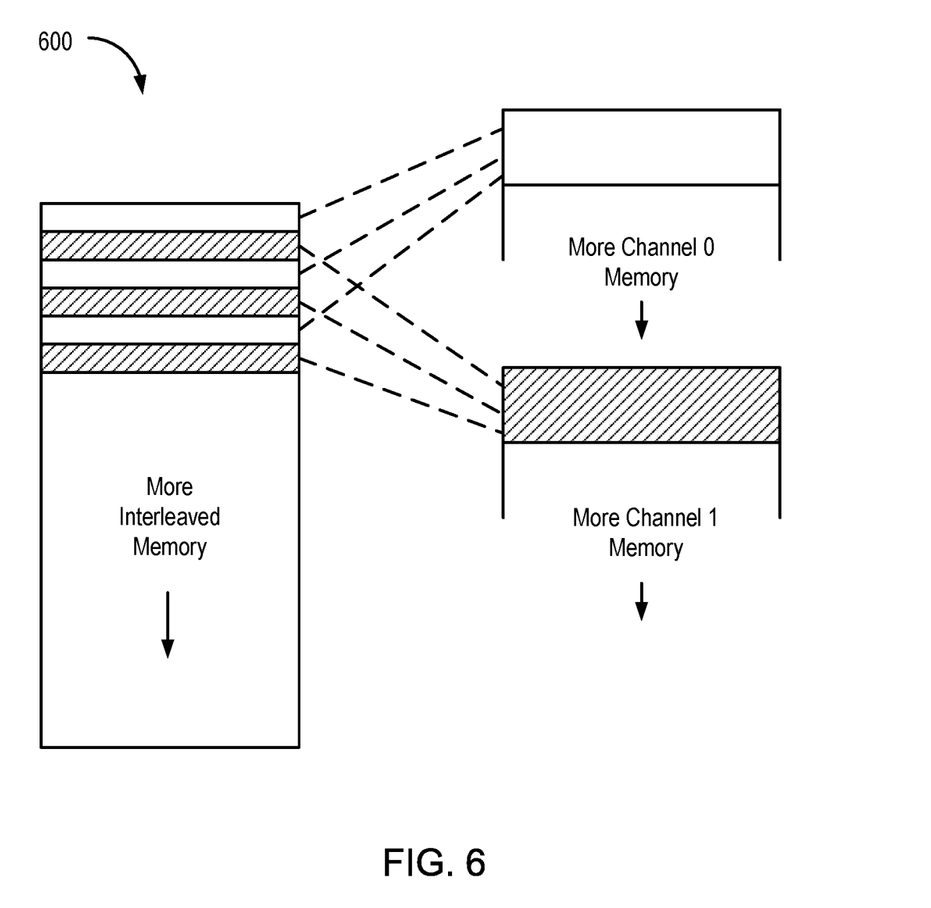
FIG. 6 is a block diagram depicting an example address layout of a memory according to an example.

FIG. 6 is a block diagram depicting a two-channel interleaving scheme according to an example. The interleave granularity in the example is 1K. The address interleave and transaction chopping circuit 508 manages interleaving at each NoC entry point (e.g., NMU). Interleaving is a property of a memory region. If a memory region is interleaved across two memory channels, then half of the memory in the region goes to one channel and half to the other channel. The mapping is arranged in strided fashion such that alternate 1K regions go to different channels. If a burst transaction is sent to an NMU and crosses an interleave boundary (in this case 1K), the transaction is chopped at the interleave boundary. This ensure that a single transaction never crosses an interleave boundary. As shown in the example, the non-filled memory stripes go to memory channel 0 and the filled memory stripes go to memory channel 1.

In this manner, the NoC provides better balancing of bandwidth across multiple memory channels for various applications. The NoC provides ease of management of the memory pool in the device (for both hardware and software). If the memory is not interleaved, the master circuit accessing the memory needs to be aware of which memory channel the data is held in in order to be able to optimize performance. For example, if the majority of memory requests all target one of four memory channels and the other three channels sit relatively idle, device performance can be poor. Memory interleaving spreads the traffic across memory channels (or generically across pools of memory). This keeps each memory channel relatively busy and spreads traffic load across channels.

Figure 7:
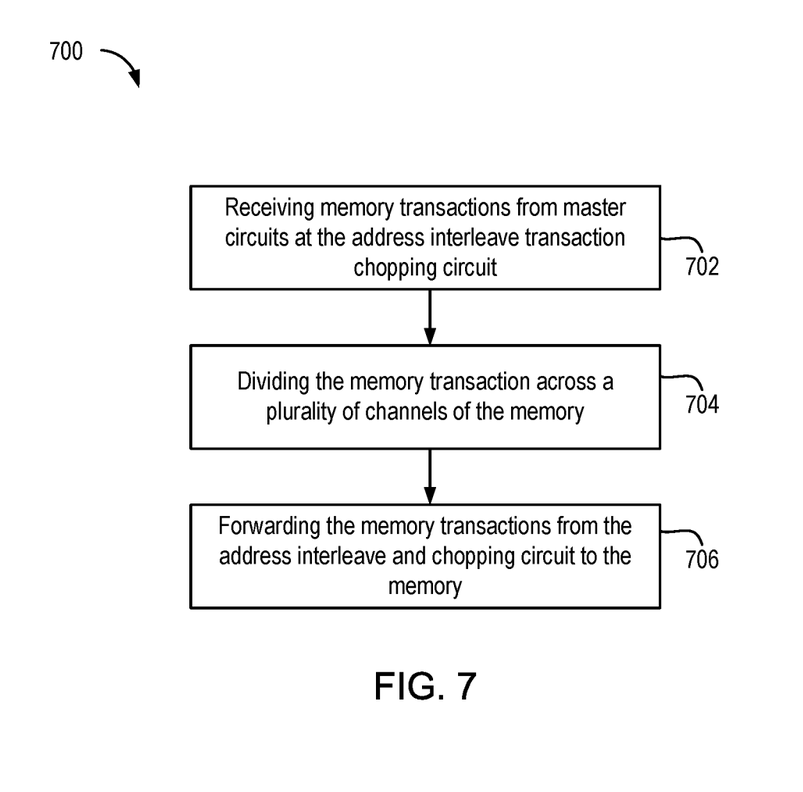
FIG. 7 is a flow diagram depicting a method of communication between a plurality of master circuits and a memory in an SoC according to an example.

FIG. 7 is a flow diagram depicting a method 700 of communication between a plurality of master circuits and a memory in an SoC according to an example. The method 700 begins at step 702, where the address interleave and transaction chopping circuit 508 receives memory transactions from a plurality of master circuits for the memory. In an example, the address interleave and transaction chopping circuit 508 is shared among the master circuits. Alternatively, the address interleave and transaction chopping circuit 508 is distributed among the master circuits. At step 704, the address interleave and transaction chopping circuit 508 divides each memory transaction across a plurality of channels of the memory. At step 706, the address interleave and transaction chopping circuit 508 forwards the memory transactions to the respective channels of the memory.

Figure 8:
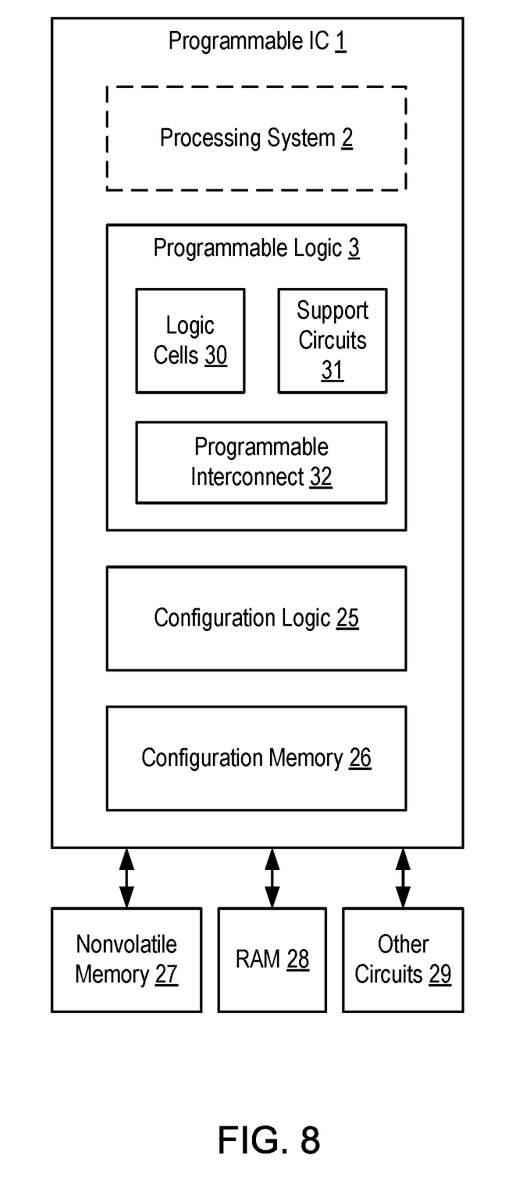
FIG. 8 is a block diagram depicting a programmable integrated circuit in which the NoC described herein can be employed according to an example.

FIG. 8 is a block diagram depicting a programmable IC 1 according to an example in which the NoC 106 described herein can be used. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, 10 circuits, and the like.

Figure 9:
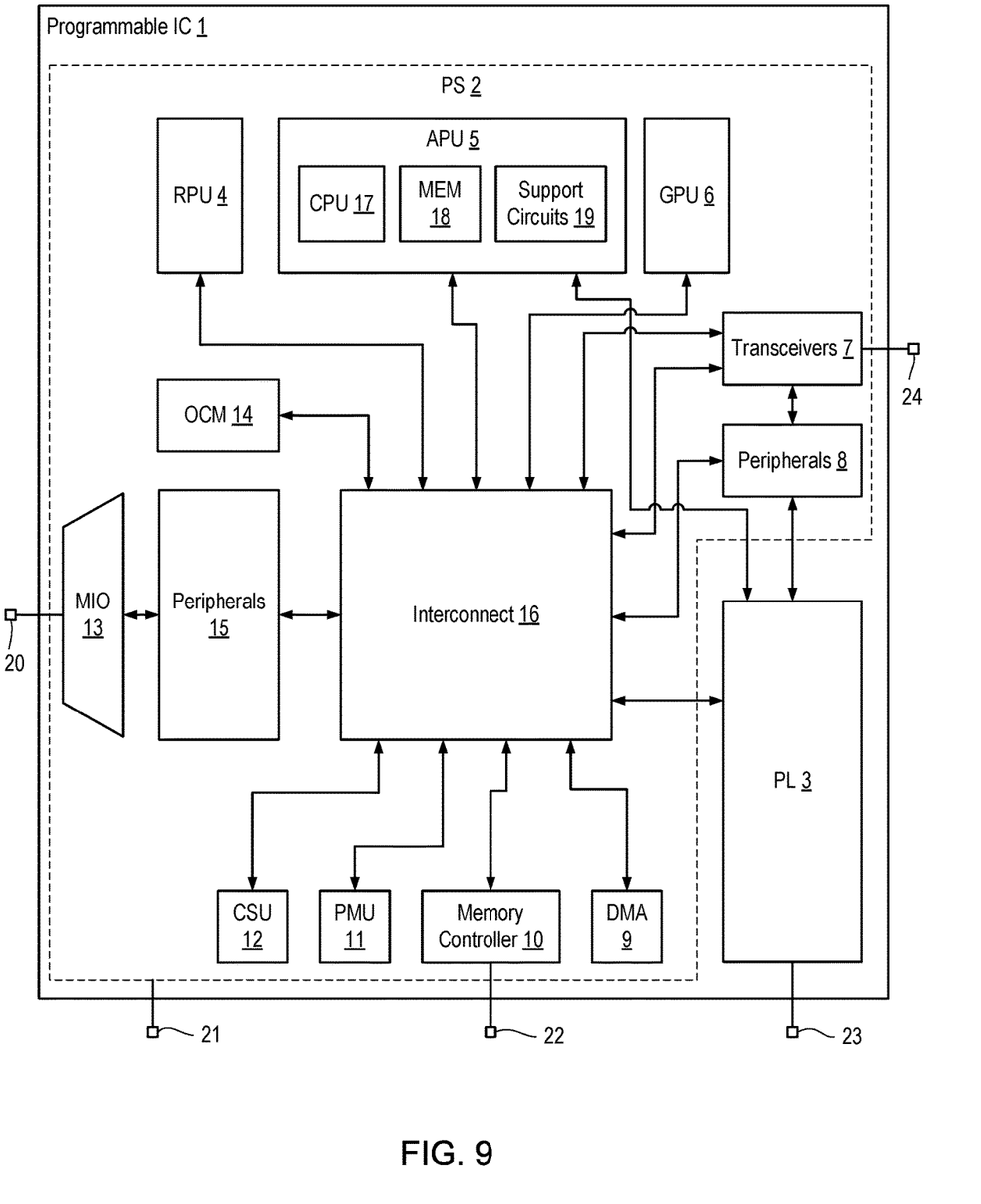
FIG. 9 is a block diagram depicting a System-on-Chip (SoC) implementation of the programmable IC of FIG. 8 according to an example.

FIG. 9 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19. The APU 5 can include other circuitry, including L1 and L2 caches and the like. The RPU 4 can include additional circuitry, such as L1 caches and the like. The interconnect 16 can include cache-coherent interconnect or the like.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 132 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 10:
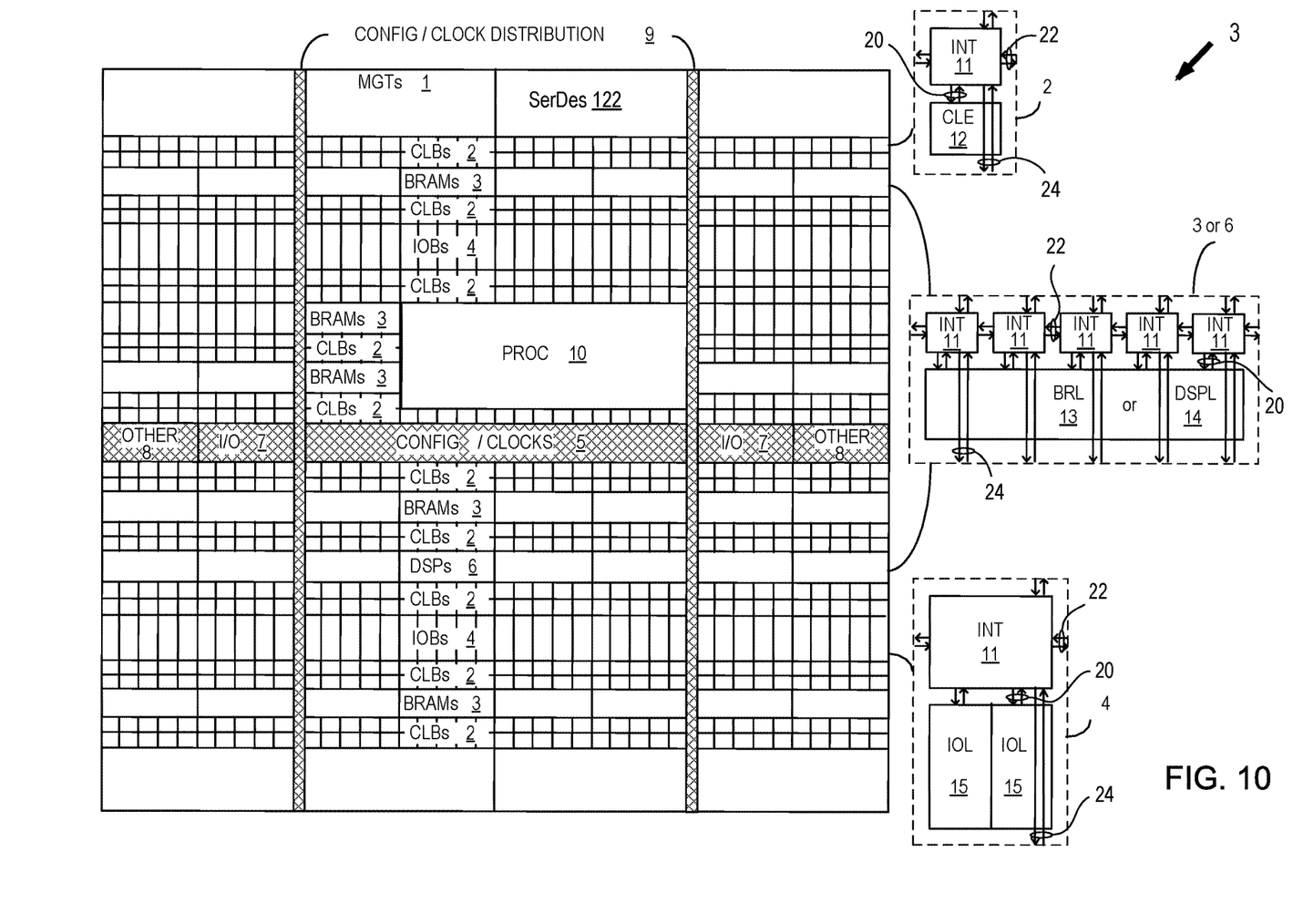
FIG. 10 illustrates a field programmable gate array (FPGA) implementation of the programmable IC of FIG. 8 according to an example.

FIG. 10 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 12. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 13) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 10 include additional logic blocks that disrupt the regular columnar structure making up a large part of the FPGA. The additional logic blocks can be programmable blocks and/or dedicated logic.

Note that FIG. 10 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 10 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A programmable integrated circuit (IC), comprising:
a processing system;
programmable logic;
a plurality of master circuits disposed in the processing system, the programmable logic, or both the processing system and the programmable logic;
an address interleave and transaction chopping circuit configured to receive memory mapped transactions from the plurality of master circuits;
a memory having a plurality of channels; and
a system interconnect configured to couple the address interleave and transaction chopping circuit to the memory;
wherein the address interleave and transaction chopping circuit is further configured to:
divide a first memory mapped transaction of the memory mapped transactions received from a first master circuit of the plurality of master circuits, the first memory mapped transaction being divided into divided memory mapped transactions across the plurality of channels of the memory at respective selected boundaries;
determine a destination channel of the plurality of channels for each of the divided memory mapped transactions; and
forward each of the divided memory mapped transactions to the corresponding destination channel via the system interconnect.

2. The programmable IC of claim 1, wherein each of the plurality of master circuits is one of a hardened circuit or a circuit configured in the programmable logic.

3. The programmable IC of claim 1, wherein each of the plurality of channels is a respective one of a plurality of memory circuits.

4. The programmable IC of claim 1, wherein each of the plurality of channels is a respective region of a plurality of regions in a memory circuit.

5. The programmable IC of claim 1, wherein the address interleave and transaction chopping circuit is further configured to remove one or more address bits of each of the memory mapped transactions based on a number of the plurality of channels.

6. The programmable IC of claim 5, wherein the plurality of channels include N channels, wherein a number of address bits removed is K, where $2^K=N$, and wherein N and K are integers greater than zero.

7. The programmable IC of claim 1, wherein the address interleave and transaction chopping circuit comprises hardened circuitry in the programmable IC.

8. The programmable IC of claim 1, wherein the address interleave and transaction chopping circuit comprises a plurality of circuits each disposed in a respective one of the plurality of master circuits.

9. The programmable IC of claim 1, wherein the address interleave and transaction chopping circuit is shared among the plurality of master circuits, and wherein the programmable IC further comprises:
a local interconnect configured to couple the plurality of master circuits to the address interleave and transaction chopping circuit.

10. The programmable IC of claim 1, wherein the memory comprises circuitry configured in the programmable logic.

11. A method of communication between a plurality of master circuits and a memory in a system-on-chip (SoC), comprising:
receiving, at an address interleave and transaction chopping circuit, a memory mapped transaction from a first master circuit of the plurality of master circuits for the memory;
dividing, by the address interleave and transaction chopping circuit, the memory mapped transaction into divided memory mapped transactions across a plurality of channels of the memory at respective selected boundaries;
determining a destination channel of the plurality of channels for each of the divided memory mapped transactions; and
forwarding, via a system interconnect, each of the divided memory mapped transactions from the address interleave and transaction chopping circuit to the corresponding destination channel.

12. The method of claim 11, wherein each of the plurality of master circuits is one of a hardened circuit or a circuit configured in programmable logic.

13. The method of claim 11, wherein each of the plurality of channels is a respective one of a plurality of memory circuits.

14. The method of claim 11, wherein each of the plurality of channels is a respective region of a plurality of regions in a memory circuit.

15. The method of claim 11, wherein the address interleave and transaction chopping circuit is configured to remove one or more address bits of the memory mapped transaction based on a number of the plurality of channels.

16. The method of claim 15, wherein the plurality of channels include N channels, wherein a number of address bits removed is K, where $2^K=N$, and wherein N and K are integers greater than zero.

17. The method of claim 11, wherein the address interleave and transaction chopping circuit comprises hardened circuitry in the SoC.

18. The method of claim 11, wherein the address interleave and transaction chopping circuit comprises a plurality of circuits each disposed in a respective one of the plurality of master circuits.

19. The method of claim 11, wherein the address interleave and transaction chopping circuit is shared among the plurality of master circuits.

20. The method of claim 11, wherein the memory comprises circuitry configured in programmable logic.

21. An integrated circuit (IC), comprising:
a plurality of master circuits;
an address interleave and transaction chopping circuit configured to receive memory mapped transactions from the plurality of master circuits;

a memory having a plurality of channels; and a system interconnect configured to couple the address interleave and transaction chopping circuit to the memory;

wherein the address interleave and transaction chopping circuit is further configured to:

divide a first memory mapped transaction of the memory mapped transactions received from a first master circuit of the plurality of master circuits, the first memory mapped transaction being divided into divided memory mapped transactions across the plurality of channels of the memory at respective selected boundaries;

determine a destination channel of the plurality of channels for each of the divided memory mapped transactions; and forward each of the divided memory mapped transactions to the corresponding destination channel via the system interconnect.

\* \* \* \* \*